United States Patent Office 3,544,412
Patented Dec. 1, 1970

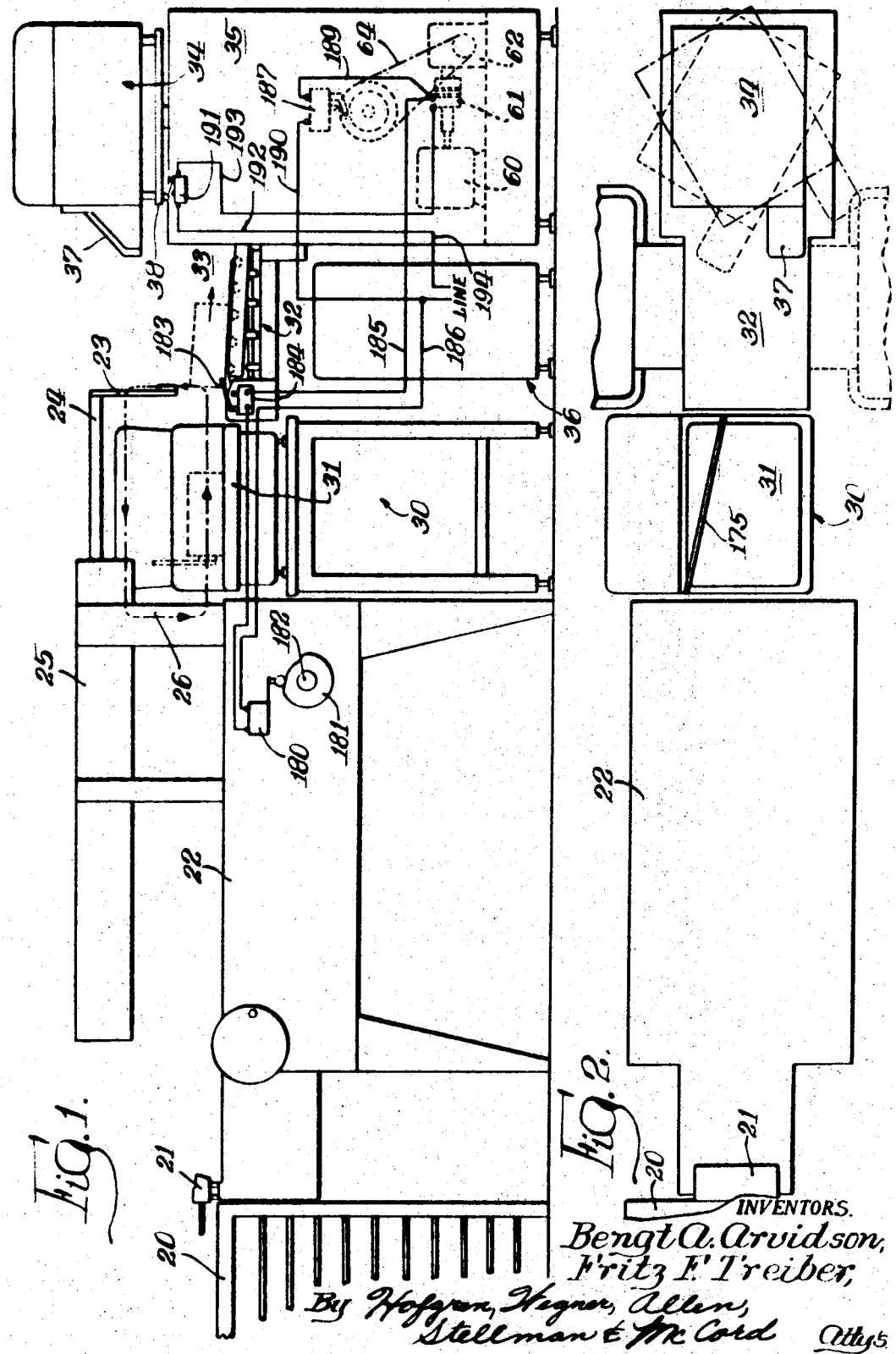

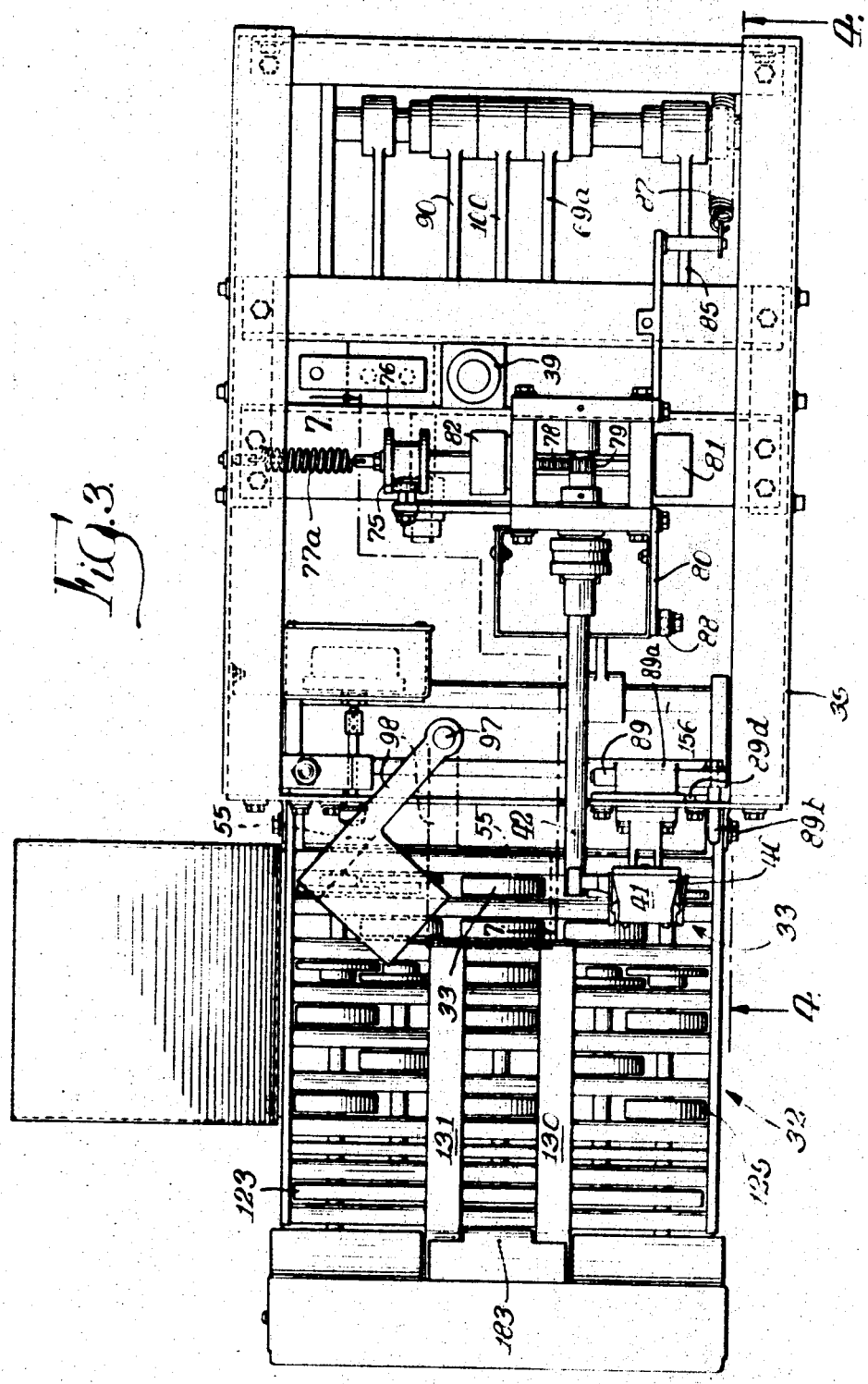

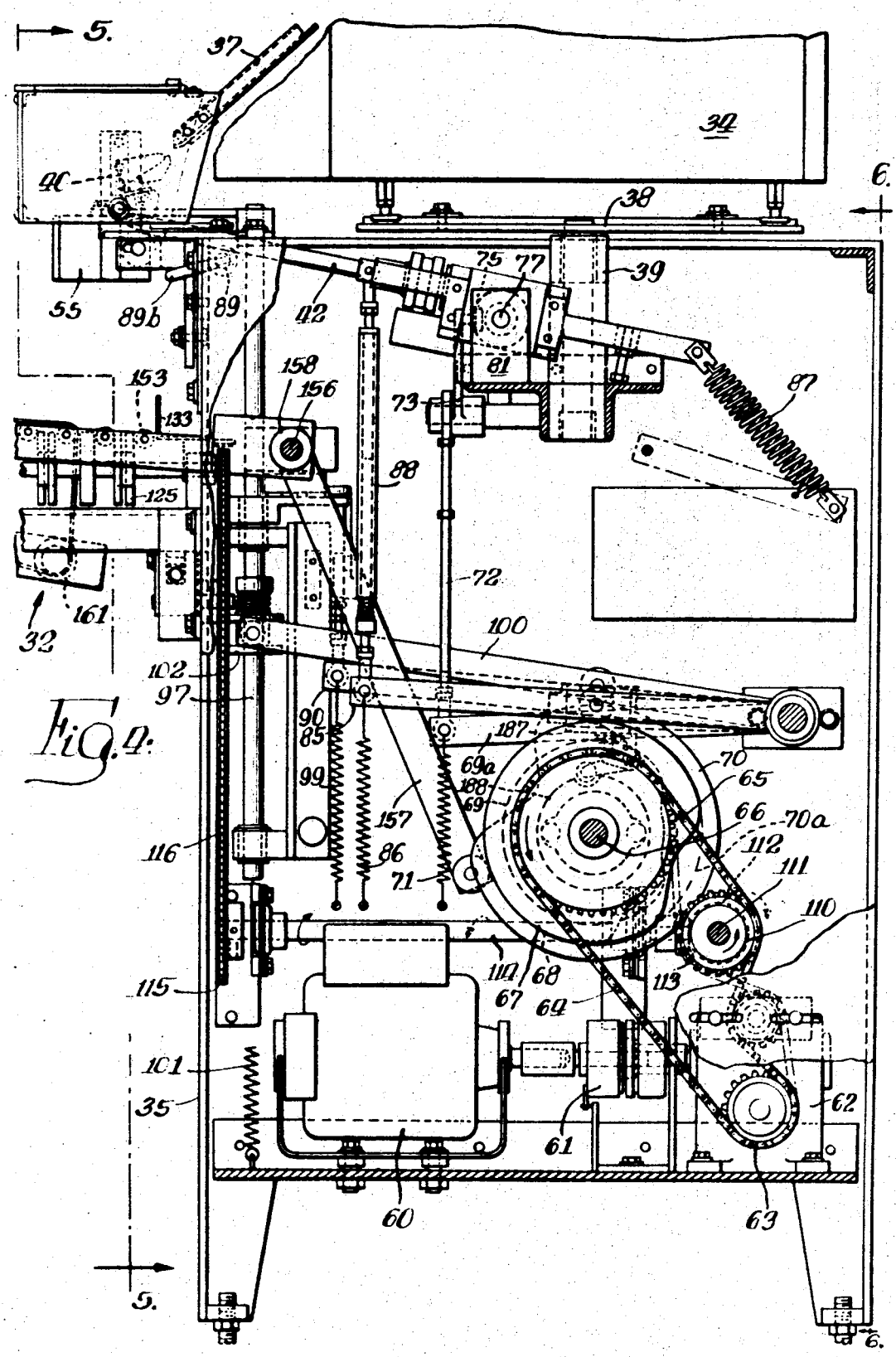

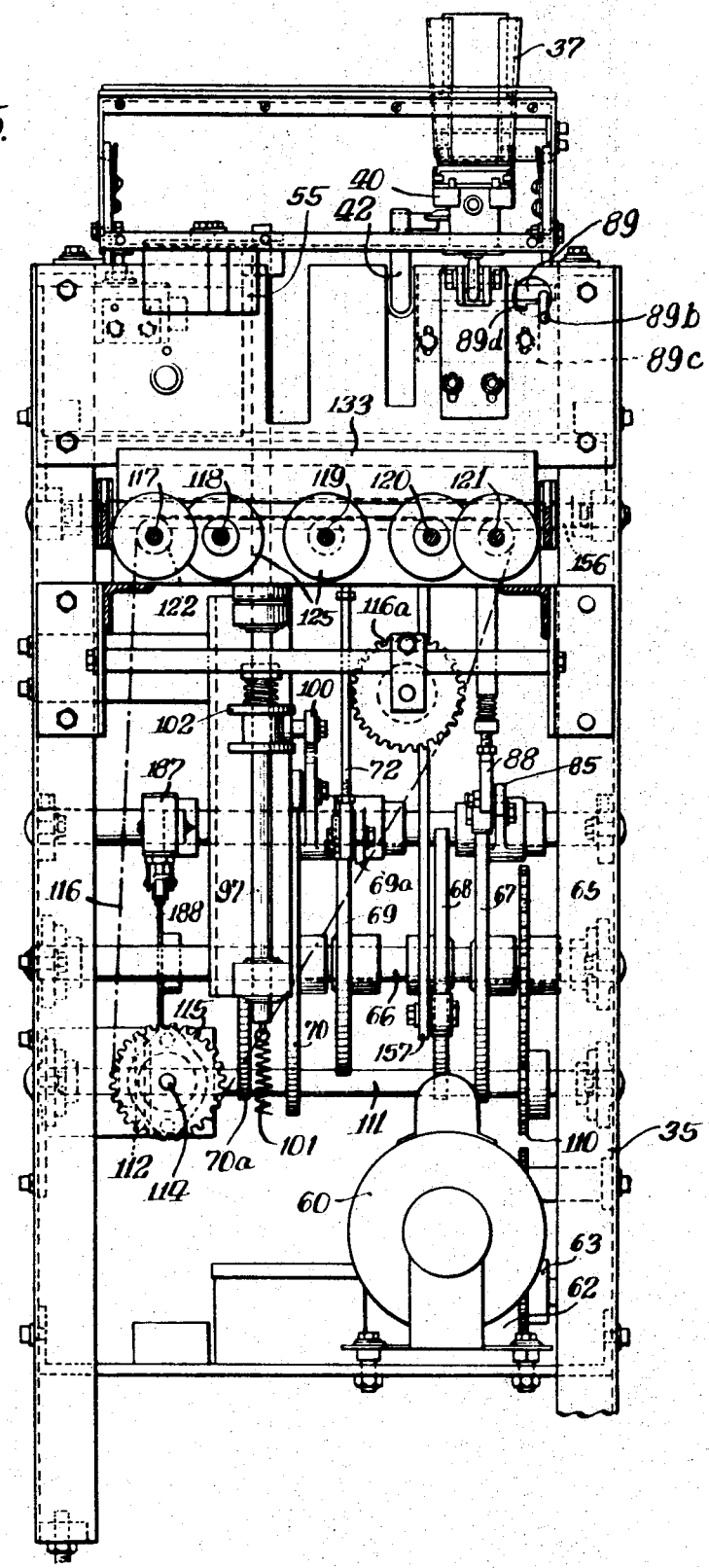

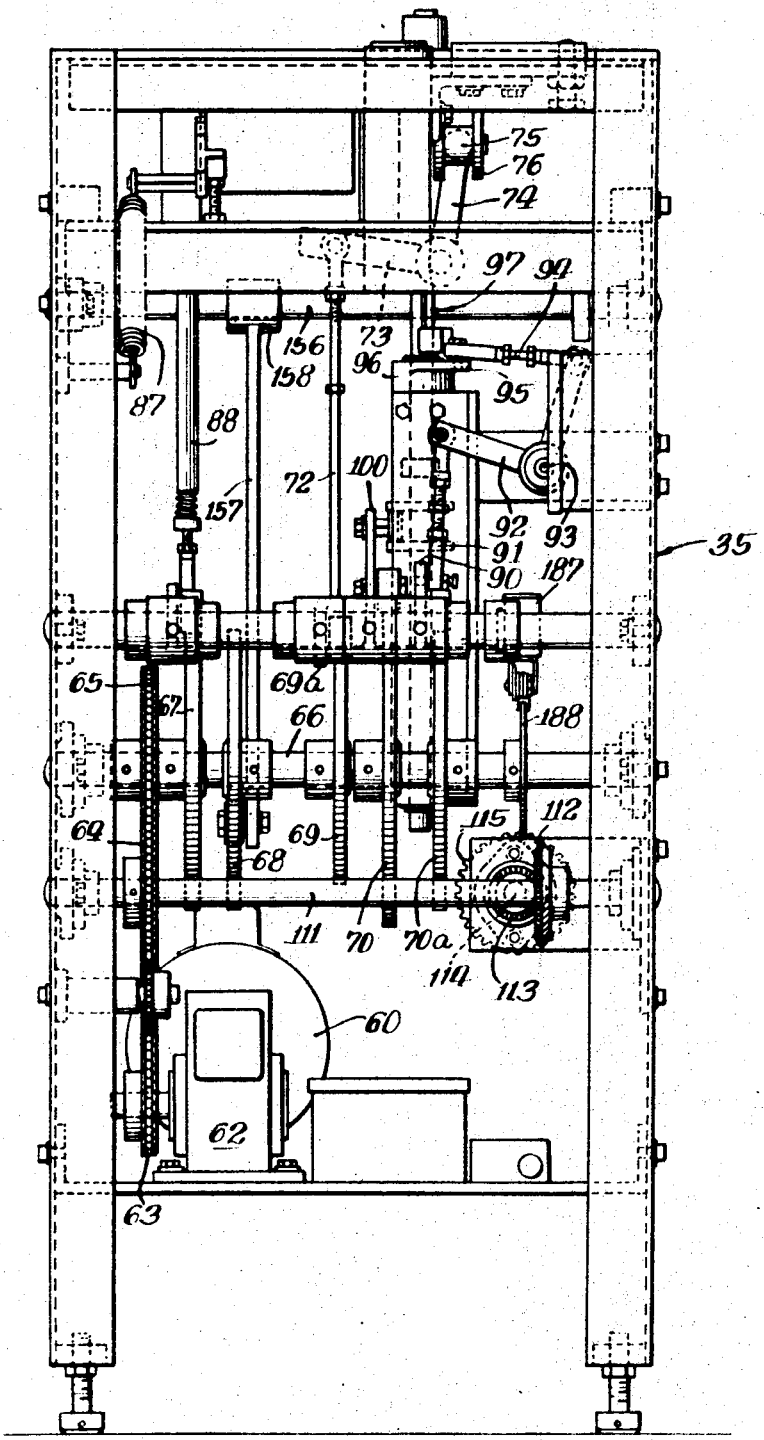

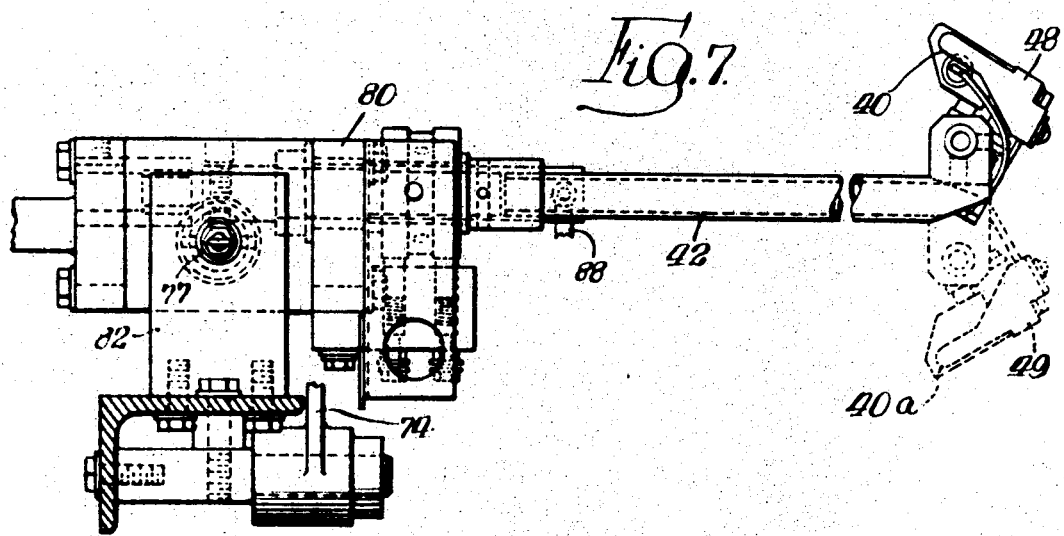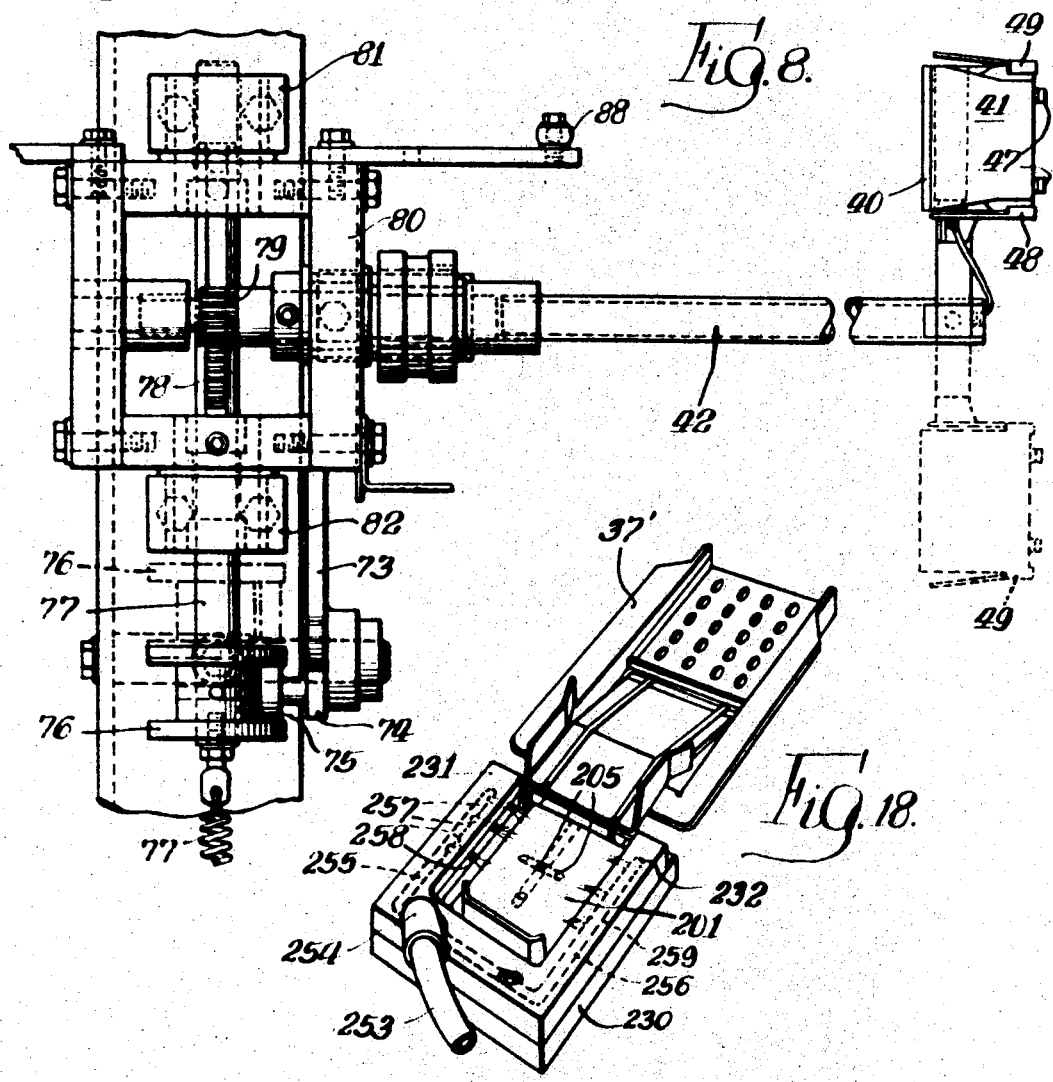

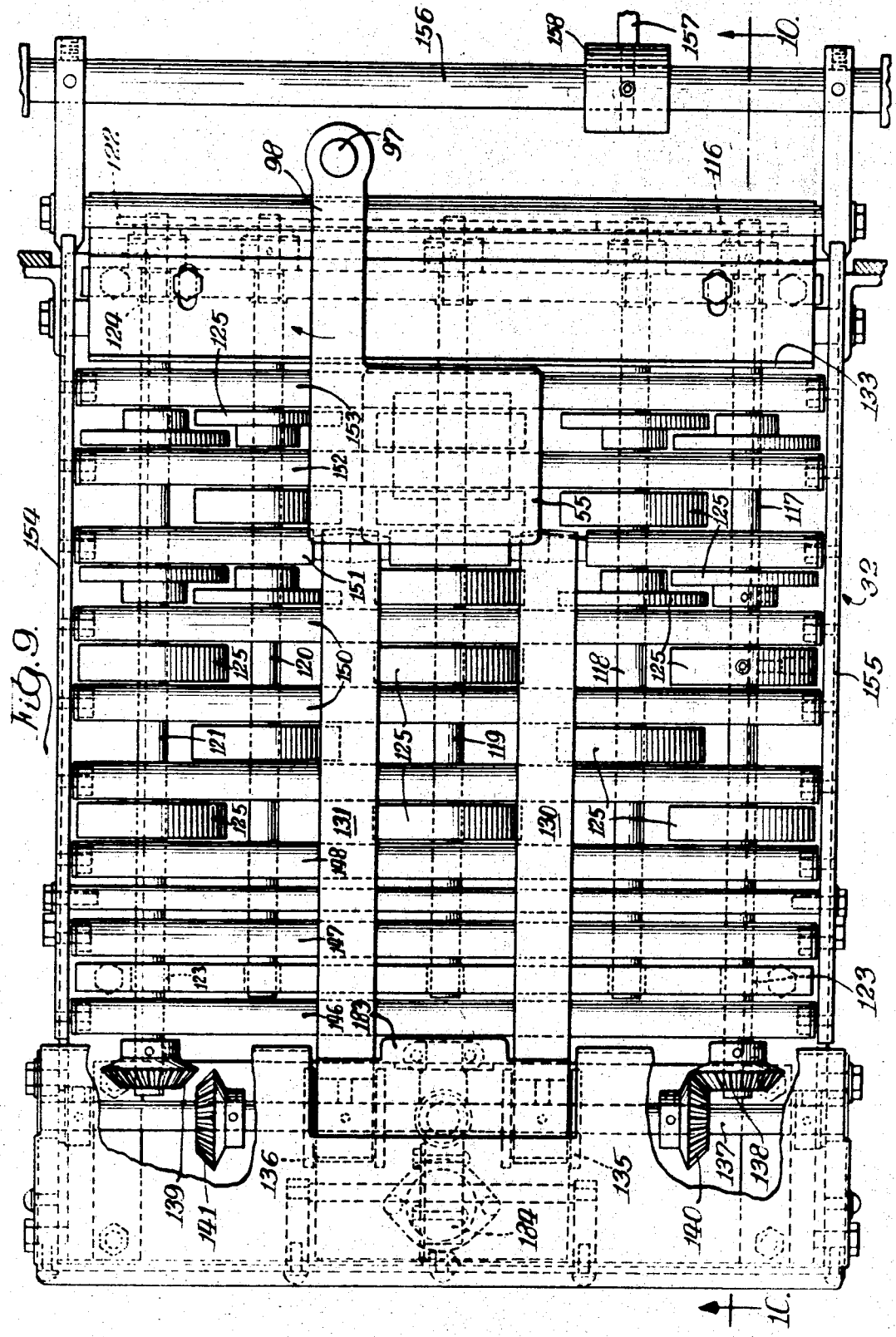

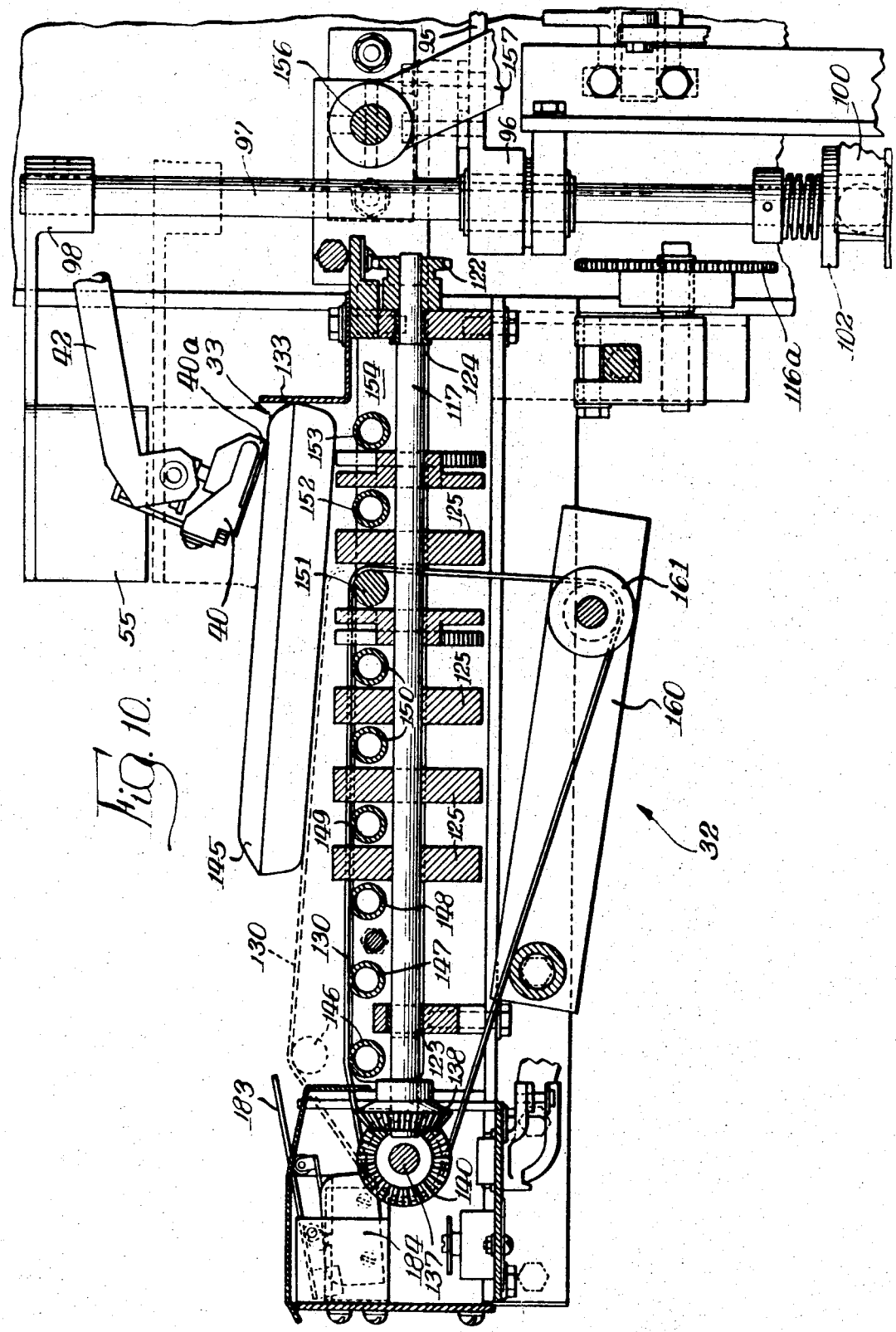

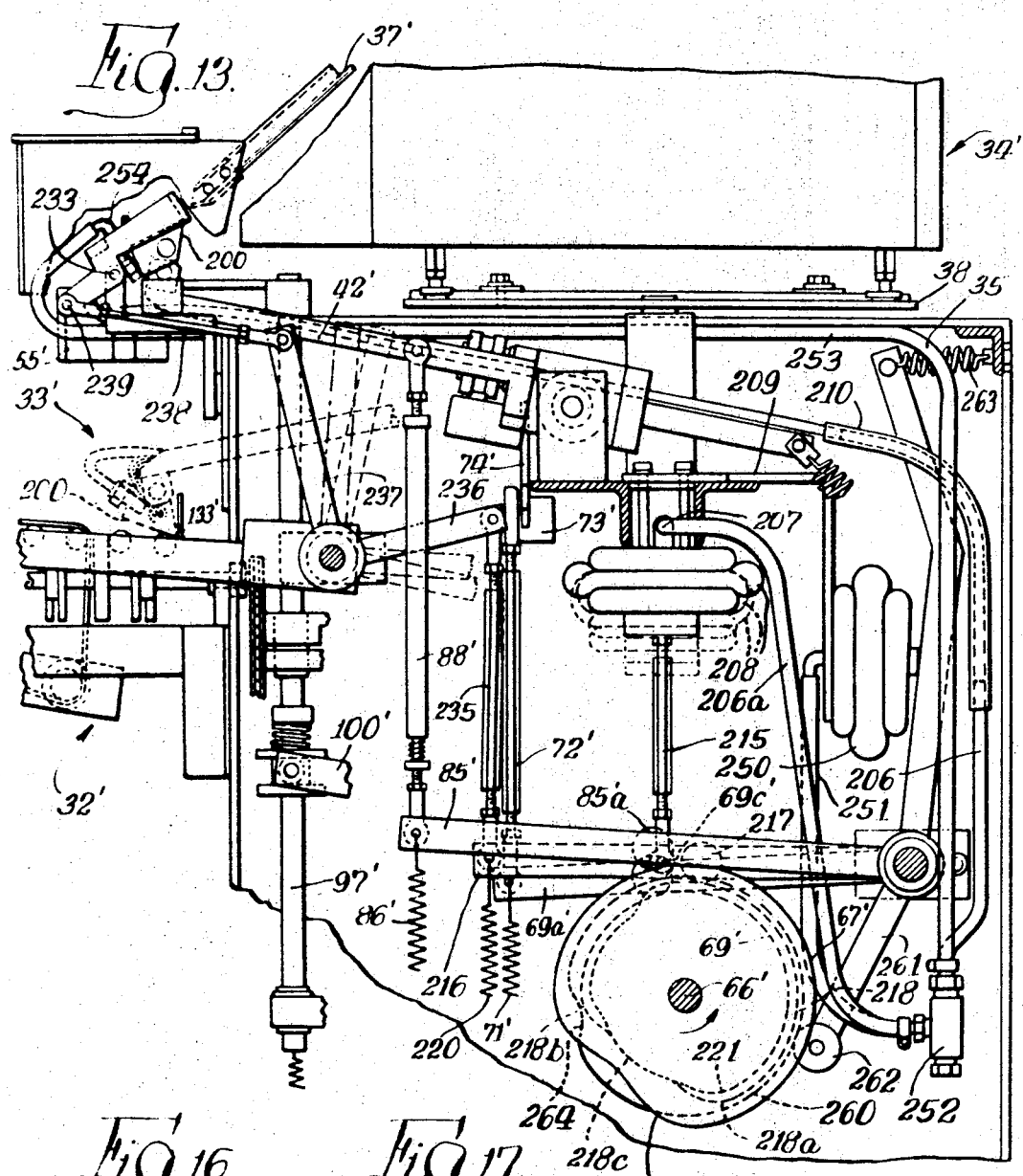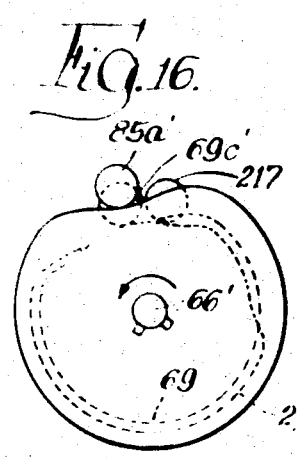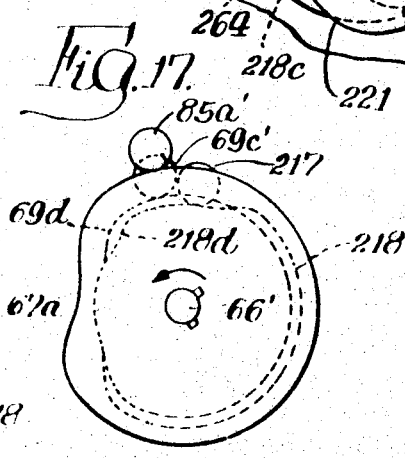

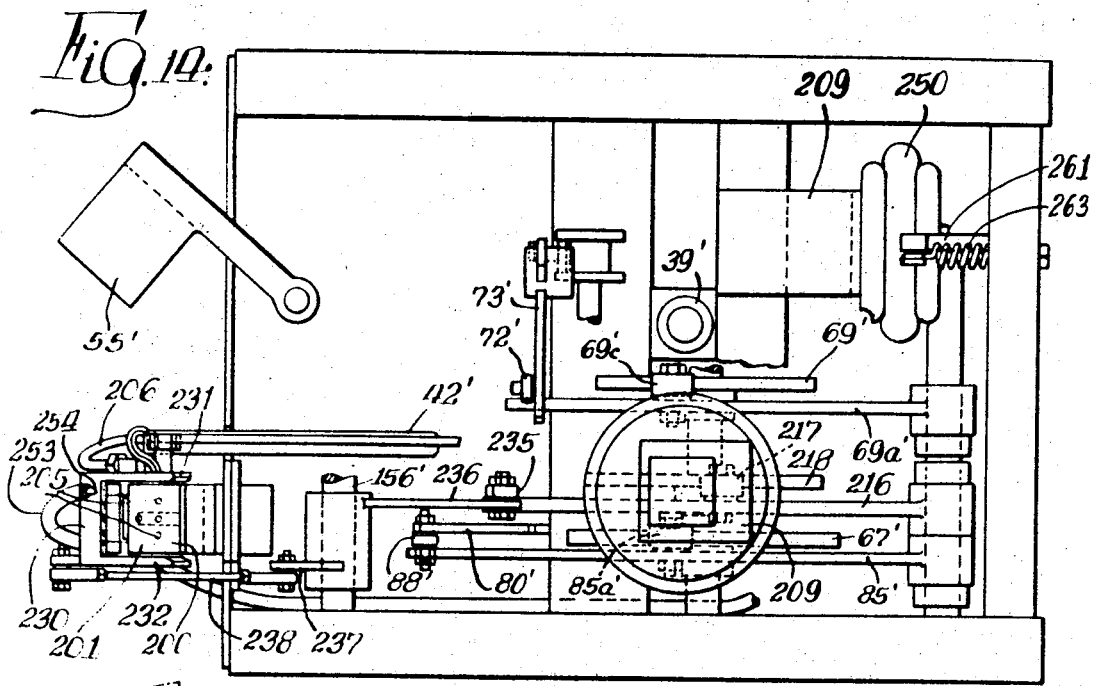
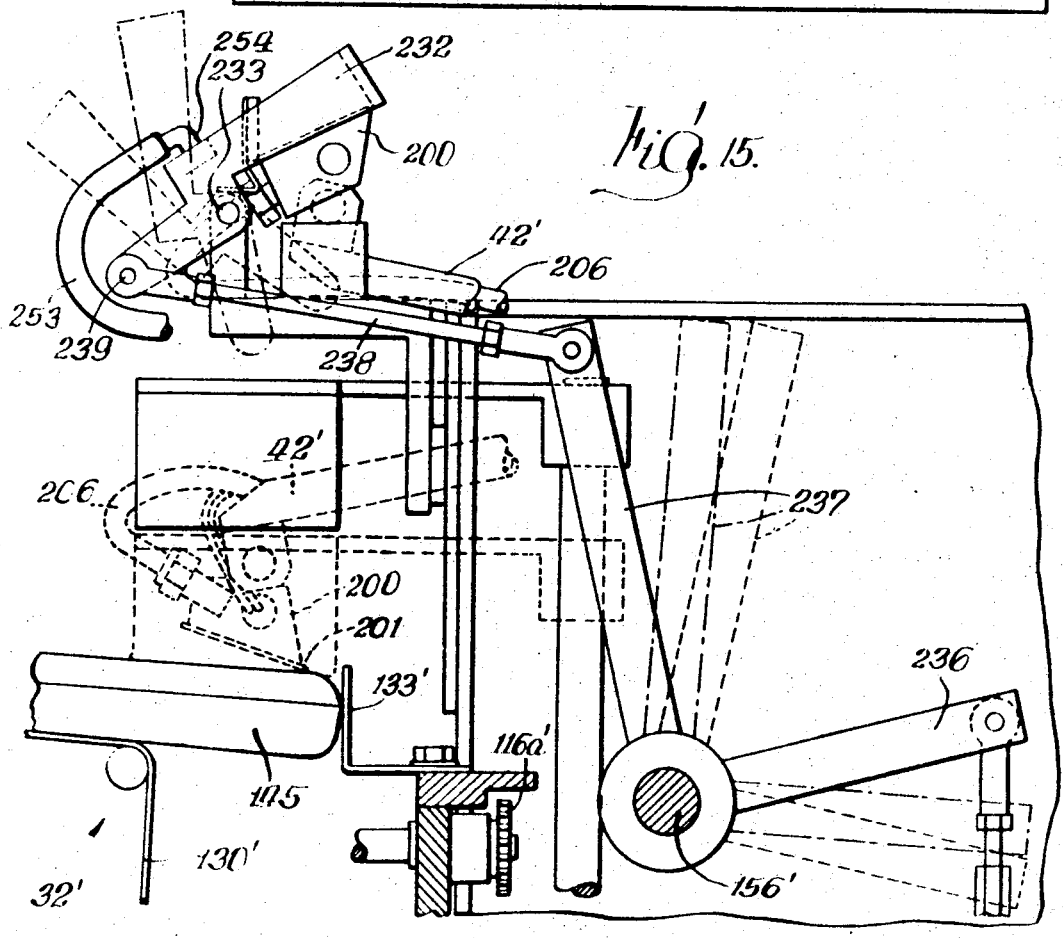

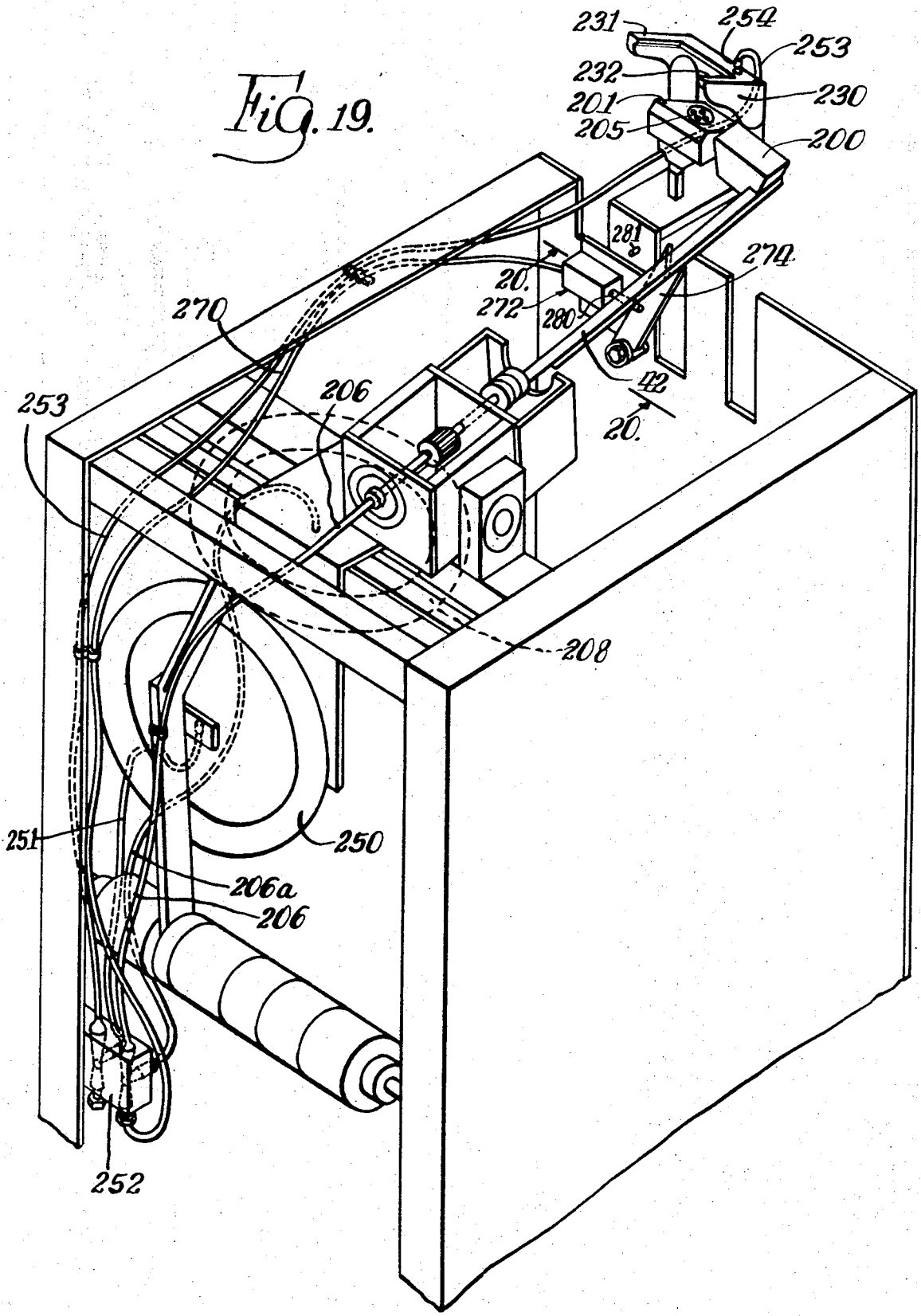

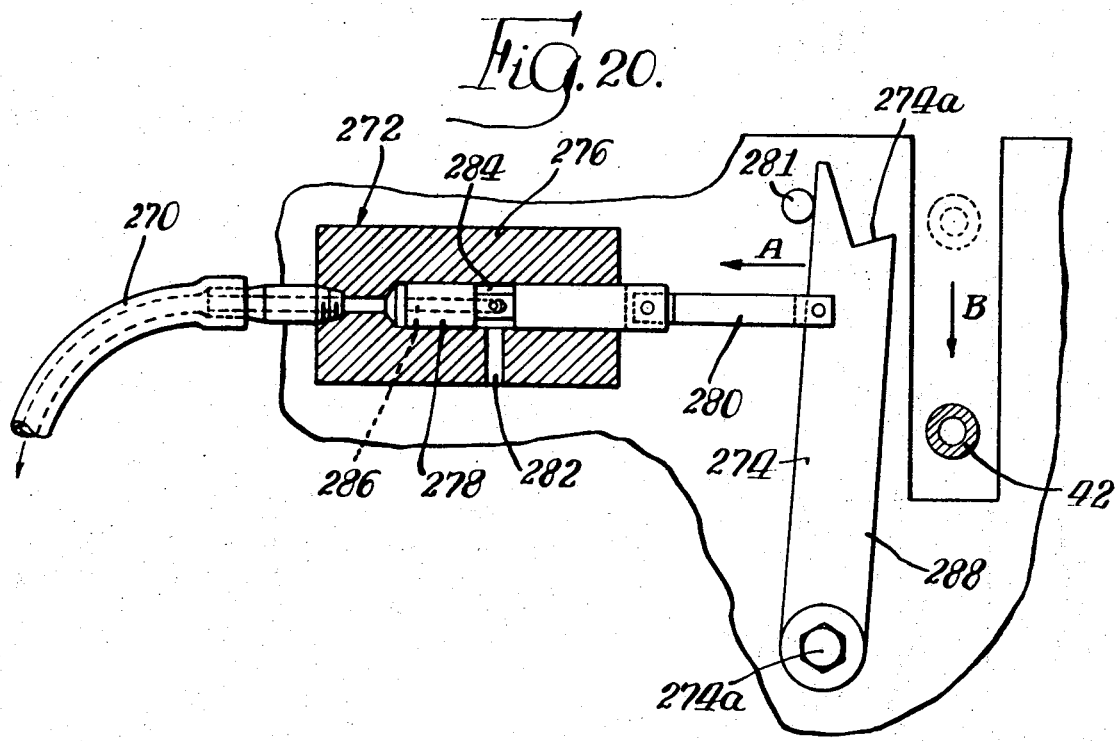
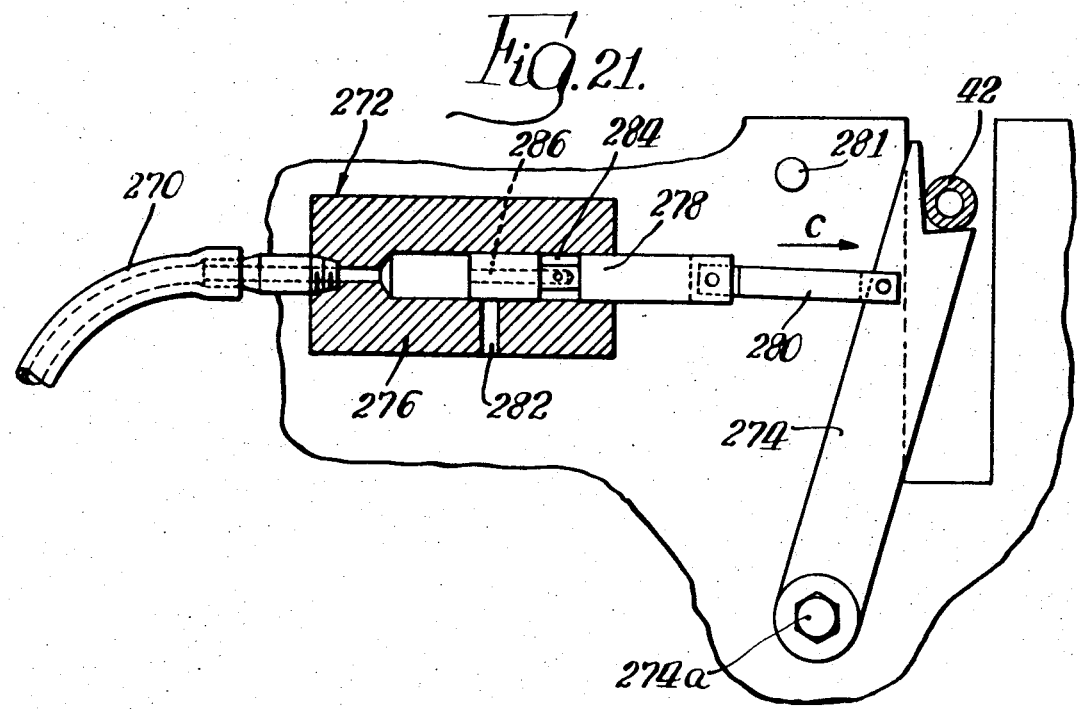

3,544,412
PACKAGE LABELLING EQUIPMENT
Bengt A. Arvidson, Villa Park, and Fritz F. Treiber, Niles, Ill., assignors to Corley-Miller, Inc., a corporation of Ohio
Continuation-in-part of application Ser. No. 451,742, Apr. 29, 1965, which is a continuation-in-part of applications Ser. No. 114,779, June 5, 1961, and Ser. No. 200,608, June 1, 1962. This application Aug. 16, 1967, Ser. No. 660,966
Int. Cl. B32b 31/04
U.S. Cl. 156—360                 5 Claims

ABSTRACT OF THE DISCLOSURE

A package labelling device in which means are provided for delivering a printed label to a transfer member which applies the label to a package. The transfer member includes a heated platen having an air opening to which suction is applied to hold the label on the platen and for subsequently discontinuing the suction to aid in removing the label from the platen and applying it to the package. Means are provided selectively positionable in the path of movement of the transfer member to prevent contact of the platen with the package. In one embodiment, a manually operated stop pin is selectively positionable in the path of movement of the transfer member. In another embodiment, a stop arm is normally positioned in the path of movement of the transfer member and a piston and cylinder device retracts the stop arm whenever a label is properly located on the platen. The piston is controlled by the means for applying suction to the air opening on the platen such that the piston moves the stop arm out of the path of movement of the transfer member when vacuum is created at the air opening by blockage thereof by a label.

BACKGROUND OF THE INVENTION

This application is a continuation-in-part of our copending application Ser. No. 451,742, filed Apr. 29, 1965, which now has matured into Pat. No. 3,342,661, dated Sept. 19, 1967, and which in turn is a continuation-in-part of our applications Ser. Nos. 114,779, filed June 5, 1961, and 200,608, filed June 1, 1962, both of which now are abandoned.

It has become important in an automatic package labelling system, as disclosed herein and in said copending application, that the heated label applicator be prevented from contacting the package to be labelled if the package is wrapped in a film which melts on contact with the hot applicator. As disclosed in said copending application, a manual stop pin is selectively positionable in the path of movement of a label transfer member to prevent contact of the heated platen with a package. This is especially important in the case where a label should not have been delivered to the applicator. This invention is directed to providing means responsive to the absence of a label on the platen to automatically prevent contact of the platen with a package.

SUMMARY OF THE INVENTION

The principal object of this invention is to provide, in a package labelling system of the character described, a means for selectively preventing contact of the label applying member with a package to be labelled.

A further object of this invention is to provide selectively operable means coacting with a label applying member to block movement of said member prior to engagement thereof with a package whereby no physical contact is made with the package and pressure air directs the label onto the package.

Still another object of this invention is to provide means responsive to the absence of a label on the applicator for preventing contact of the applicator with a package.

An additional object of this invention is to provide means as defined in the preceding paragraph which includes a stop arm normally positioned in the path of movement of the label applicator and a piston and cylinder device for moving the stop arm out of the path of the applicator whenever a label is located on the applicator.

More particularly, the means set forth in the preceding paragraph includes a stop arm which is normally moved by gravity into the path of movement of the heated label applicator. The piston is operatively connected to a bellows-type device which applies suction to an opening on the applicator to hold a label thereon. Vacuum at the opening, caused by the presence of a label covering the opening, moves the piston and the stop arm connected thereto out of the path of movement of the applicator.

Further objects and advantages will become apparent from the following detailed description taken in connection with the accompanying drawings.

DESCRIPTION OF THE DRAWINGS

FIG. 1 is a side elevational view of one embodiment of the package weighing and labelling apparatus in association with a wrapping machine;

FIG. 2 is a diagrammatic plan view of the structure shown in FIG. 1;

FIG. 3 is a plan view of the package labelling apparature with the label printing and delivering mechanism removed from the right-hand side thereof;

FIG. 4 is a vertical section taken generally along the line 4—4 in FIG. 3;

FIG. 5 is an end elevational view of the package labeling apparatus with part of the conveying mechanism in section taken along the line 5—5 in FIG. 4;

FIG. 6 is an end elevational view opposite from that shown in FIG. 5 with the label printing and delivery mechanism omitted from the top thereof and taken generally along the line 6—6 in FIG. 4;

FIG. 7 is a fragmentary vertical section taken generally along the line 7—7 in FIG. 3;

FIG. 8 is a plan view of the mechanism shown in FIG. 7;

FIG. 9 is a fragmentary plan view of the infeed conveying mechanism;

FIG. 10 is a vertical section taken generally along the line 10—10 in FIG. 9;

FIG. 13 is a fragmentary side elevational view similar to FIG. 4 but showing another embodiment of the invention;

FIG. 14 is a plan view of the mechanism shown in FIG. 13;

FIG. 15 is a fragmentary enlarged view of a part of the mechanism shown at the upper left-hand part of FIG. 13;

FIG. 16 is a diagrammatic view of certain operating cams shown in a position different from that in FIG. 13;

FIG. 17 is still another view of the cams in a position different from that shown in FIG. 16;

FIG. 18 is a perspective view of the label chute, label transfer member and label guide in associated relation;

FIG. 19 is a schematic perspective view showing another embodiment of the invention which includes means for automatically preventing contact of the heated platen with a package in the event no label is located on the platen;

FIG. 20 is a fragmentary vertical section taken generally along the line 20—20 in FIG. 19, with the stop arm moved out of the path of movement of the transfer member; and FIG. 21 is a fragmentary sectional view similar to that of FIG. 20, with the stop arm in the path of movement of the transfer member.

DETAILED DESCRIPTION OF THE INVENTION

Figure 11:
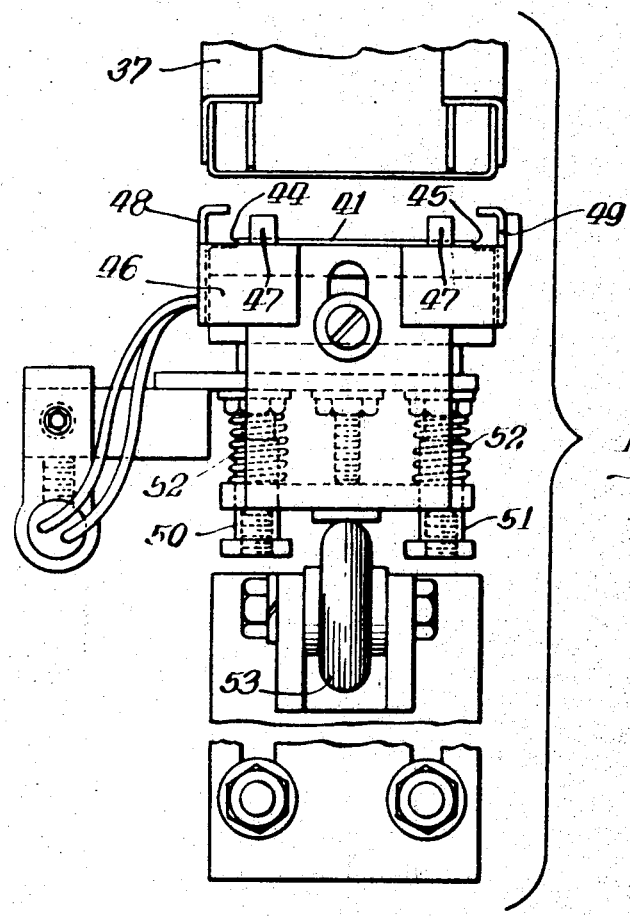
FIG. 11 is a detailed elevational view of the label transfer apparatus.

As stated in the above-mentioned application, with the apparatus disclosed herein, it is possible to completely prepare for sale a package of the type commonly used in supermarkets for meats and the like embodying a board or tray which is wrapped with transparent material, such as cellophane. Not only is the package completely wrapped, but it is also labelled with a label indicating the item, its weight and the price per pound, as well as the total price, taking into account the weight of the item in the package. The invention herein is directed particularly to means for stopping movement of the label applying member prior to engagement thereof with a package in the event that no label is delivered to said member.

In order to carry out the complete package wrapping and labelling operation, a group of mechanisms is shown in FIGS. 1 and 2 which a pre-wrap table 20 supports a package for initial wrapping with the package then being manually passed across a hot plate 21 where the bottom overlap of the wrapping material is sealed together and the package with the ends of the wrapping material still to be folded is passed through a wrapping machine 22. The foregoing structure being of the type disclosed in Arvidson United States Letters Patent No. 2,981,043. This wrapping machine as described in detail in the Arvidson patent functions to progressively wrap the ends of the wrapping material about the package and to seal the material while maintaining a tight wrap as the package is advanced from left to right as viewed in FIGS. 1 and 2 of the drawings herein. The package is caused to advance progressively in steps through the wrapping machine 22 by a conveying mechanism in the form of overhead pushers, as shown in FIG. 3 of the patent referred to supra, embodying a series of spaced-apart pusher members which have horizontal advancing movement, as well as vertical up and down movements toward and away from a package. A pusher member of this type is shown in FIG. 1 of the drawings herein at 23 and is supported on a bar 24 connected to suitable chain mechanism located within a housing 25 which causes the pusher member 23 to have a cycle of movement as shown in broken line at 26. The extreme right-hand position of the pusher member 23 is shown in FIG. 1 and is sufficient to carry the package to an operative position to be described hereinafter.

A weighing scale 30 is positioned adjacent the exit end of the wrapping machine 22 and has a scale table 31 located at the level of packages being discharged from the wrapping machine, whereby a package passing onto the scale table 31 is weighed. This movement of the package from the wrapping machine to the scale is along a generally straight line and is caused by a pusher member 23 next to the one shown in FIG. 1.

A package after leaving the scale table 31 travels to an intermediate location resting upon conveying mechanism indicated generally at 32, with the movement of the package to this position being caused by the pusher member 23, which, as shown in broken line in FIG. 1, is behind a package and carries the package to the intermediate location where the pusher member 23 then begins elevating movement to subsequently return to a position to descend and engage behind a package next on the scale table 31. The package next moves from the intermediate location to a labelling station, indicated generally at 33, in which a label having suitable indicia thereon is placed upon the package.

The label is obtained from a printing unit indicated generally at 34 mounted on top of a cabinet 35 and which is controlled from a computer, indicated generally at 36, which receives the weight information from the scale 30 and causes the printing unit 34 to deliver a label ready for placement upon the package that has previously been weighed. A package weighing and label printing system suitable for use with the apparatus disclosed herein is shown in Allen United States Letters Patent No. 2,948,466 and reference may be made thereto for more specific information with regard to the system. For purposes of our invention, it should be understood that the label, when printed, is delivered onto a chute 37 of the printer 34 where it is available for use.

As will be evident from FIGS. 1 and 2, the package has travelled from the wrapping apparatus, through the scale, and to the labelling station along a generally straight line, with the label printing mechanism 34 being at the end of this line.

As shown in FIG. 4, the label printing apparatus 34 is supported on top of the cabinet 35 by being mounted on a plate 38 which is pivotally mounted to the cabinet 35 by a pivot mounting 39. With this construction, it is possible to pivot the printing mechanism 34 about a vertical axis to have the label chute 37 extend outwardly from the package line in either direction as shown in broken line in FIG. 2, whereby manual labelling is facilitated by an operator being able to readily pick up a label from the chute 37. The mounting plate 38 is releasably detented to remain in any of its positions until forcibly moved.

The apparatus at the labelling station 33 embodies mechanism for receiving a label from the printing chute 37 and without any turning in the label cause the label to be placed upon a package in a desired position thereon with an immediately subsequent application of resilient pressure against the label on the package to firmly secure the label thereto.

The apparatus at the labelling station 33 for accomplishing these results is shown particularly in FIGS. 3 to 10 with reference being first made to FIG. 3 in which the first element is a label transfer member 40 normally positioned beneath the end of the printer chute 37. The transfer member receives a label with the printed side down and has a heated platen 41 for heating the heat-sensitive material carried on the label for securement thereof to a package. The transfer member 40 is mounted on a shaft 42 for oscillatory movement with the shaft from a position at the end of the chute 37 to a position overlying a package for subsequent descent into engagement therewith as shown in FIG. 10.

Figure 12:
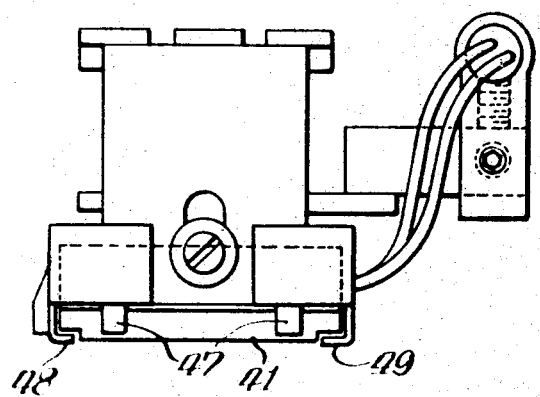
FIG. 12 is a view of the transfer member of FIG. 11 shown in position to overlie a package.

The transfer member 40 is shown in detail in FIGS. 11 and 12 in which the platen 41 is recessed at 44 and 45 and surrounded by a frame 46 having a pair of end stops 47 and label holding fingers 48 and 49 located at the sides and aligned with the recesses. The frame 46 is movably mounted on a pair of pins 50 and 51 and urged downwardly by springs 52, although the frame 46 is held in a relatively upward position by engagement with a roller 53 carried on the framework of the machine, whereby a label may enter upon the platen 41 with the fingers 48 and 49 elevated along with the stops 47. As the label transfer member 40 is swung about the axis of shaft 42, the frame 46 is moved away from the roller 53 so that the springs 52 can lower the frame 46 relative to the platen 41 which lowers the stops 47 to a level beneath the platen and causes the fingers 48 and 49 to come down and rest upon the label, although not securely clamping it due to the recesses 44 and 45. This condition is shown in FIG. 12 in which the transfer member 40 is in position to place a label on the package.

In order to prevent wrinkling of the label, the label is not securely gripped, thus permitting sliding movement of the label out from between the platen 41 and the fingers 48 and 49.

It will be seen that due to the swinging of the transfer member 40 about the shaft 42, the labelling station 33, as shown in FIG. 3, is generally located midway between the front and rear of the machine. With the package still at this station and upon return movement of the transfer member 40 to its initial position, a resilient pressure member 55 is caused to move to a position overlying the label on the package and then to descend to firmly press the label onto the package. The raised and lowered positions of the pressure member 55 are shown in full line and broken line, respectively, in FIG. 10.

After the applying of the label to the package, the package is caused to leave the apparatus by travelling in a direction transverse to that previously travelled as caused by the conveyor mechanism 32, as more fully described hereinafter.

The power system for operating the various components will now be described. This mechanism is located generally within the cabinet 35 and is powered by a motor 60 driving the input side of an electric clutch 61 with the output side of the clutch (when the clutch is energized) driving, through a gear box 62, a sprocket 63 about which a chain 64 passes. The chain 64 engages a sprocket 65 on a cam shaft 66 having cams 67, 68, 69, 70 and 70a thereon as viewed from left to right in FIG. 6. The cams 67 and 69 provide for operation of the label transfer member 40 in the following sequence. Rotation of the cam shaft 66 in a counterclockwise direction as viewed in FIG. 4 results in a low in the cam 69 permitting lowering movement of a cam follower arm 69a under the urging of a spring 71 connected to the bottom of the cabinet 35. The spring pulls down on a link 72 connected to an arm 73 of a bell crank as viewed in FIG. 6 with the other arm 74 of the bell crank having a roller 75 captured between the flanges of a spool 76 fastened to a shaft 77, as viewed in FIG. 8, having a rack gear 78 formed integrally therewith which meshes with gear teeth 79 at an end of the rotatable shaft 42 carrying the transfer member 40.

The shaft 42 is journalled in a pivotally mounted casing 80 which is secured to the shaft 77 with the shaft 77 being journalled in bearings 81 and 82. Thus, lowering movement of the link 72 causes longitudinal shift of the shaft 77 against the action of a spring 77a connected thereto, upwardly as viewed in FIG. 8, to rotate the shaft 42 and swing the transfer member 40 approximately 180° to have the gummed side of the label facing downwardly toward the package. During this operation, as previously described, the label is loosely held in the transfer member by the fingers 48 and 49. This action has taken place because the transfer member has left the roller 53.

With the transfer member 40 in the position just referred to and as shown in broken line in FIGS. 7 and 8, the cam 67 on the cam shaft 66 becomes operative to cause a low 67a on the cam to permit a cam follower and a cam follower arm 85 to descend under the weight of the parts associated with the transfer member 40. A spring 86 connected to the cam follower arm 85 and the bottom of the cabinet 35 assists with the weight of the parts being partially counterbalanced by a spring 87. The connection between the cam follower arm 85 and the frame 80 for the transfer member is through a link 88 shown in FIGS. 4, 6 and 8. The descent of the transfer member 40 is yieldable whereby the transfer member 40 stops upon engagement with a package which can be of variable height for placement of a label on the package. Subsequently, the transfer member is again raised as the cam follower connected to the link 88 is caused to be elevated by a high on the cam 67 and after the elevation, the transfer member is rotated back 180° to its position adjacent the label chute 37 as caused by the high on the cam 69.

The transfer member 40 is positioned at an acute angle relative to the mounting shaft 42 as shown in FIG. 7. When the transfer member is moved to inverted position as shown in broken line in FIG. 7, the angle is such as to have only a leading part 40a of the transfer member engage the package whereby only a portion of the label is pressed against the package (FIGS. 10, 13 and 15) with the result that only a limited amount of heat is transmitted from the transfer member to the package. The label is only tacked to the package and the presser member 55 then presses the label onto the package. If the transfer member is to avoid contact with the package entirely, a selectively positionable pin can be positioned across the path of the mounting shaft 42. This pin 89 is shown in retracted position in FIGS. 3 and 5 in which it is withdrawn from the path of the mounting shaft 42. The pin is slidably and rotatably mounted in a collar 89a supported by the frame of the machine and has a manipulatable handle 89b for holding the pin in the retracted position or an advanced position lying across the path of the mounting shaft 42. The handle coacts with a notched plate 89c and is shown in one notch with a second notch 89d positioned to hold the handle when the pin 89 is shifted to its advanced position. The transfer member is lowered yieldably at a controlled rate by the cam 67, so that the shaft 42 can come to rest on pin 89 without shock.

The presser member 55 also has two movements with one movement being a pivoting action about a vertical axis to assume a position overlying the label previously applied to a package as shown in FIG. 9. The other position is a withdrawn position in which the presser member is pivoted clockwise a distance as viewed in FIG. 9 to be out of the way of the transfer member 40. In addition, the presser member has an alternate down and up movement to firmly press a label onto a package with these two limits of movement being shown in FIG. 10.

The pivoting action about a vertical axis for the presser member 55 is obtained from the cam 70a on cam shaft 66 which controls the position of a cam follower arm 90 connected by a link 91 to a bell crank 92 pivoted at 93 to the frame, with the bell crank connected by a link 94 to an arm 95 formed integrally with a collar 96 which is slidably keyed to a shaft 97. The shaft 97 has the presser member fastened thereto by an arm 98 as seen in FIG. 10. The follower arm 90 is caused to follow its cam by means of a spring 99 connected therebetween and the bottom of the cabinet 35. In this operation, a high on the cam 70a causes elevation of the link 91 and rotation of the bell crank 92 to provide counterclockwise rotation of the presser arm support shaft 97 as viewed in FIG. 9 to place the presser member 55 over a label on the package.

The presser member 55 is then caused to descent to yieldably engage a label on the package by the cam 70 in which a low permits descent of a follower arm 100 whereby shaft 97 lowers as additionally urged by a spring 101 connected between the shaft and the bottom of the cabinet 35. The cam follower arm 100 engages a collar 102 fixed to the shaft 97, as shown in FIG. 4. This descent is yieldable so that regardless of the height of package, the label is firmly engaged on the package and this soft pressure is further insured by the presser member 55 having a substantial thickness of relatively soft rubberlike material on the underside thereof. The presser member, after engaging the label on the package, returns to its initial out-of-the-way position by further operation of the cams 70 and 70a through the linkage connected to the presser member.

The conveying mechanism 32 will now be described in detail. This conveying mechanism has two distinct functions, with the first being to carry a package from an intermediate location adjacent the scale to the labelling station 33 and after the application of a label to move the package transversely out of the apparatus with this movement being to either side as shown in full and broken lines in FIG. 2 in which a suitable lug may be located to receive the packages. Power for the conveying mechanism 32 is derived from the motor 60 referred to hereinbefore in which the take-off is from the chain 64 by means of a sprocket 110 fastened to a shaft 111 which, as shown in FIG. 6, extends across the machine and has a gear 112 meshing with a gear 113 on a shaft 114 which runs to the front end of the cabinet 35 and has a sprocket 115 which, through a chain 116 passing about idler 116a, drives a series of sprockets located one on each of a plurality of shafts 117, 118, 119, 120 and 121 extending lengthwise of the machine. The sprocket for one shaft 117 is indicated at 122 and the others are the same. Each of the shafts is mounted in a framework by bearings as indicated at 123 and 124 for the shaft 117 and each of the shafts has a series of conveying rollers 125 secured thereto whereby rotation of the shafts 117–121 results in rotation of the rollers for causing a package to travel transversely to the machine at times when a package is resting upon the rollers 125.

In addition to the transverse conveying action by the rollers 125, the conveying mechanism 32 also involves infeed mechanism for the packages in the form of a pair of belts 130 and 131 as shown in FIGS. 3, 9 and 10 which travel in a direction to have the upper reach thereof travelling toward a fixed abutment 133 which locates a package at the labelling station 33. Specifically, each of the belts 130 and 131 passes about pulleys 135 and 136, respectively, which are mounted on a rotatable shaft 137 extending transversely and disposed adjacent the end of the shafts 117–121. As seen in FIG. 9, each of the shafts 117 and 121 carries a gear 138 and 139, respectively. As shown in FIG. 9, the gear 138 meshes with a gear 140 on the shaft 137 to cause rotation of this shaft and the belt pulleys 135 and 136. The alternate gear 139 is provided for selective engagement with a gear 141 on the shaft 137 after release of gear 138 when the direction of rotation of the shafts 117–121 is changed by having the chain 64 pass about the sprocket 110 in the manner shown in broken line in FIG. 4. This change may be made when it is desired to cause packages to travel transversely out of the machine in the direction opposite from that shown set up for in FIG. 9. When this is desired, it is then necessary to shift the engagement of gears with respect to shaft 137 to make certain that the belts 130 and 131 still travel towards the package labelling station 33.

In a cycle of operation, both the belts 130 and 131 are continuously travelling, as are the rollers 125 continuously rotating. The selective operation of one or the other in movement of a package such as indicated at 145 is dependent upon whether the belts 130 and 131 are in their lower position as shown in full line in FIG. 10 or are elevated as shown in broken line in FIG. 10. For this purpose, a series of transversely extending rollers 146–153 are carried in a movable frame defined by side bars 154 and 155, which mount the ends of these rollers and which are secured to a transversely extending shaft 156 which is pivotally mounted in the frame of the machine. The rotative position of the shaft 156 is controlled by the cam 68 on the cam shaft 66 which engages a follower carried on an arm 157 secured to the shaft 156 by a collar 158.

Thus, as a cycle of operation begins upon rotation of the cam shaft 66, the shaft 156 is rotated to elevate the rollers 146–153 which causes elevation of the belts 130 and 131 to raise a package above the transversely rotating rollers 125 and advance a package into engagement with the abutment 133 at the package labelling station 33. The cam 68 functions to maintain the belts elevated during the label applying and pressing operation and this is facilitated by the belts continuing to rotate and holding the package against the locating abutment 133. After the labelling operation is completed, the cam 68 permits the belts 130 and 131 to lower and the rollers 125 which are rotating all this time then become operative to advance a package transversely out of the machine since the belts 130 and 131 have lowered to a level beneath the tops of the rollers 125, as will be seen in FIG. 10.

The belts 130 and 131 in either of their positions are caused to rotate by the shaft 137 and an idler system involving the pivoted arms 160 and idler rollers 161 carried thereon take up slack in the belts.

It will thus be seen that structure has been described which advances a package to a labelling station and, regardless of the dimension of the package, a label is placed a certain distance from the edge thereof by the fixed relation of the label transfer member 40 with respect to the locating abutment 133 at the labelling station. In order to align the package transversely for the desired positioning of the label in that direction, a suitable bar as shown in FIG. 2 and indicated at 175 overlies the scale table to guide a package for movement onto the intermediate conveyor 32 for travel thereof to the labelling station and this bar can be adjusted for the desired transverse location of the package.

Our invention further includes a suitable control system to make certain that the labelling apparatus does not cycle when a package is not present and functions to take care of various width packages so that all packages, regardless of their width, will trip the cycle for the labelling apparatus at exactly the same part of the machine cycle, thereby giving the same length of duration of heat to the label for properly activating the thermo-adhesive on the label.

This system includes a first, normally open switch 180 which is operated from a cam 181 carried on a shaft 182 which drives the pusher members 23 and which is shaft 65 in the patent previously referred to. The cam 181 functions to close switch 180 when the pusher member 23 has reached its extreme right-hand position, as shown in FIG. 1, to indicate that a package has been carried the full distance by the pusher member regardless of the width thereof and, in any event, sufficient to engage a plate 183 which, as shown in FIG. 10, is depressible by a package. A second, normally open switch 184 is associated with the depressible plate 183 and is closed when the plate is depressed by a package. The switches 180 and 184 are in series and connected by a wire 185 to the electric clutch 61 with a second wire 186 connecting both of the switches to one side of the line.

When the switch 180 is closed and also the switch 184, this indicates that a package is in position to be conveyed to the labelling station and that the pusher member 23 has completed its advance of the package. This causes energization of the electric clutch 61 to drive the gear box 62 and initiate a cycle of the label applying apparatus. In order to continue the cycling of the labelling apparatus through one complete cycle, a third switch 187 which is normally open is caused to be closed when the cycle starts by a cam 188 on the cam shaft 66 (FIG. 6) which, when the cycle starts, causes a high to elevate a follower and close the switch 187. The switch 187 is connected by a wire 189 to the clutch 61 and another wire 190 to the main power line. This insures that the complete cycle will take place, even though both of switches 180 and 184 will open during the labelling cycle.

A fourth switch 191 is connected by wires 192 and 193 into the main power line 194 and is normally closed by the plate 40 which mounts the label printing apparatus 34 whereby when the printing apparatus is swung to one side or the other of the machine for hand labelling, the switch 191 is opened to break the circuit to the electric clutch 61 to make certain that no cycling of the labelling apparatus takes place during the manual operation.

The embodiment of FIGS. 13–17 is generally similar to the embodiment disclosed in FIGS. 1–12, except for the operation of the label transfer member and the utilization of an air blown down device for the label. Parts corresponding in the two embodiments are given similar reference numerals with a prime affixed thereto in the embodiment of FIGS. 13–17.

The general organization of structure is similar with a conveying mechanism indicated generally at 32' conveying a package 145 to a labelling station indicated generally at 33' where a label supplied from a printing unit indicated generally at 34' is affixed to the package, the label being delivered from the printing unit onto a chute 37' with the adhesive side up.

The transfer member 200 having a heated platen 201 for acting on the label adhesive is mounted on the shaft 42' for rotatable movement therewith and up and down movement. This embodiment relates primarily to the use of suction for holding the label on the transfer member during transfer and use of an air discharge or air blast to decisively remote the label from the platen 201 and firmly seat the label on a package 145.

As described in connection with the embodiments of FIGS. 1–12, the transfer member first rotates with the shaft 42' to invert a label to place the adhesive side down and then the transfer member descends into yieldable contact with a package. The transfer member then rises and again rotates back to a position lined up with the chute 37'. The rotatable movement of the transfer member is produced by the cam 69' operating a cam follower arm 69a' having a follower roller 69c'. The cam shaft 66' rotates from the position of FIG. 13, with the transfer member lined up with the chute 37' to a position in which the transfer member is inverted by the follower roller 69c' being on the low of the cam 69' as shown in FIG. 16 which illustrates the position of the parts when the transfer member is down on a package. Subsequent to inverting of the transfer member, the cam 67' presents its low to a follower 85a' on the follower arm 85' which through a link 88' permits downward movement of the transfer member under the urging of a spring 86' as the follower roller 85a' moves into the low of the cam 67'. Inasmuch as this movement is yieldably caused by the spring 86' various heights of package may be handled.

In order to hold a label on the platen 201, a series of air openings 205 are formed therein opening to the interior of the platen with the interior connected to an air line 206 disposed within the hollow shaft 42'. The air line 206 runs to an air check valve and from there line 206a extends to a connection 207 to a bellows-like member 208 supported from the frame of the machine by a mounting plate 209. This bellows may be of any suitable type with one example being a shock-absorber for vehicles sold under the name "Airmount." The air line 206 includes a section of flexible tubing 210 to permit a twist in the tube as the transfer member rotates with the shaft 42'. The bellows is operated between limit positions shown in full line and broken line in FIG. 13 with the full line position being the location at the beginning of a suction stroke and the broken line being at the end of the suction stroke and the beginning of the air discharge stroke. Operation of the bellows is effected by a stem 215 connected to a cam follower arm 216 having a follower roller 217 engageable with a cam 218 on the cam shaft 66'. The cam 218 has a substantial arc forming a high. A low extends between points 218a and 218b with a slight rise 218c intermediate the ends of the low.

A cycle of movement may now readily be understood. The parts initially positioned to receive a label are shown in FIG. 13 with a cycle resulting from counterclockwise movement of the cam shaft 66' as viewed in FIG. 13. At the beginning of a cycle, the transfer member 200 is lined up with the chute 37' and the bellows is stationary. As the cam shaft 66' rotates, the first action occurs as point 218a of the cam 218 arrives adjacent the cam follower roller 217 to permit downward movement of the link 215 as induced by a spring 220 connected to the follower arm 216 which creates a suction at the openings 205 of the platen to hold a label on the platen. Substantially simultaneously a low beginning at point 221 on the cam 69' permits inward movement of the cam follower roller 69c' which starts the inverting movement of the transfer member. Still further in the rotation of the cam shaft 66' a low beginning at a point 221 on the cam 67' permits the spring 86' to lower the transfer member onto a package. The full extent of the movements are shown diagrammatically in FIG. 16 and it will be seen that when the transfer member has reached a fully down position, or at least at this time point in the cycle if a higher package has limited the downward movement of the transfer member, the slight rise 218c of the cam 218 has ended the suction action of the bellows 208 and actually raised the link 215 slightly to discharge air through the openings 205 of the platen to decisively release the label from the platen and secure it on the package. Following the position shown in FIG. 16, the parts return to initial position with an intermediate step in this being shown in FIG. 17, diagrammatically.

Utilization of the pin 89 described in the structure of the first embodiment to hold the transfer member 40 in a slightly elevated position can result in operation in which the transfer member 40 does not engage the package. With the pin 89 in its advanced position, the transfer member 40 is stopped and, at the proper time in the cycle, the suction is released and the following air blast directs the label onto a package. This results in no application of heat to the package, which is desirable with respect to certain types of packaged products.

In this embodiment, a movable label guide associated with the transfer member is provided to guide a label delivered from the chute 37' accurately onto the platen 201. This guide, as shown particularly in FIGS. 14, 15 and 18, embodies a U-shaped member 230 having a pair of spaced-apart legs 231 and 232 lying adjacent the opposed sides of the platen 201. This guide is pivoted at 233 for movement between an operative position, shown in full line in FIG. 15, to an extreme pivot position, shown in broken line in FIG. 15. An intermediate position is shown in dot-dash line in FIG. 15, and is one in which the guide pauses in its return movement to permit the transfer member 200 to swing back into position of alignment with the chute 37' as provided in the different height of cams 69' and 218 and specifically between the points 218d and 69d of these cams, as identified in FIG. 17. The movements of the label guide are obtained from the cam follower 216 which connects by a link 235 to a bell crank pivoted on shaft 156' and having a first arm 236 connected to the link and a second arm 237 connected by a rod 238 to the label guide by a pin as indicated at 239.

A label on the platen 201 has been heated to activate the adhesive on it. Because of this, the label has a tendency to curl and this frequently can prevent secure holding of the label to the platen 201 by the suction applied through the openings 205 of the platen.

In order to render the suction effective, air blow down means are associated with the label guide 230, to press the label down firmly on the platen. This structure includes a horizontally disposed bellows 250 mounted on a downturned section of the mounting plate 209 and having an outlet hose 251 connected to an air check valve 252. The air check valve connects to a hose 253 extending upwardly to the top of the cabinet and then extending forwardly for connection to the label guide member 230 at 254. The connection 254 communicates with a generally U-shaped internal passage having legs 255 and 256 in the guide legs 231 and 232, respectively. As shown in FIG. 18, the leg 255 of the passage has lateral passages 257 which communicate with a row of apertures 258 for directing air downwardly against a label resting on the platen 201. The leg 256 has similar lateral passages 259 connecting with apertures similar to apertures 258 to direct air against the label. With this structure, a series of air jets are directed at a downwardly inclined angle onto the label from each side of it.

The actuation of the air blow down bellows 250 is derived from a cam 260 mounted on the shaft 66' (FIG. 13) which coacts with a pivotally mounted cam follower lever 261 carrying a cam follower roller 262. The lever 261 is urged in a clockwise direction, as viewed in FIG. 13, by a spring 263 connected between the cabinet frame and an upper end of the arm. The spring 263 urges the lever 261 out of engagement with the bellows 250.

The cam 260 has a relatively short low 264 and when the follower roller 262 is in the low, as caused by the urging of the spring 263, the follower lever is away from the air blow down bellows 250. As the shaft 66' rotates, and the follower roller 262 moves out of the low 264 onto the high of the cam, the follower lever 261 is pivoted in a counterclockwise direction to compress the bellows 250 in the position shown in FIG. 13. The initial movement of the follower roller 262 onto the high of the cam 260 creates the air pressure for directing air out of the apertures in the guide member 230.

The cam 260 is mounted on the shaft 66' in relation to the cam 218 for operating the suction bellows 208 and the pivoting of the guide member 230, whereby pressure air is delivered to the guide member at the same time as the suction is applied and the guide member 230 starts to pivot.

With the structure as described herein, a label is delivered down the chute 37' onto the platen 201. As the mechanism operates, air is directed through the apertures onto the label and at the same time suction is applied through the apertures 205 to hold the label in place on the platen and the guide member 230 starts its pivoting movement to free the platen 201 for its cycle of movement to apply a label to a package.

The embodiment of FIGS. 19–21 includes an automatic means to prevent contact of the heated platen 201 with a package in the event that a label should not have been delivered or properly located on the platen. It is important that the heated platen does not contact a package without a label if the package is wrapped in a film which melts on contact with the hot platen. In a prior embodiment disclosed herein, a selectively positionable stop pin 89 is shown to be manually positionable across the path of movement of the mounting shaft 42. In the embodiment shown in FIGS. 19–21, the stop means is automatic and operates in response to the absence of a label properly located on the heated platen to prevent contact of the platen with a package.

More particularly, it is shown above that suction applied to openings 205 on the surface of platen 201 is used to hold a located label on the platen while in motion. The suction is caused by bellows 208 operating through hoses 206a, air check valve 252, and hose 206, the latter of which leads through mounting shaft 42 to the air openings on the platen. In order to make the stop means automatic and in response to the presence or absence of a label on the platen, the hose 206 which leads to the platen openings is connected through air check valve 252 to a suction hose 270 which leads to a piston and cylinder device, generally designated 272 (FIG. 19). The piston, as best seen in FIGS. 20 and 21, operates a stop arm 274 as a function of the presence or absence of a label properly located on the heated platen 201. The piston moves in a cylinder 276 which is connected by an extension arm 280 to the stop arm 274.

Referring to FIG. 20, when a label is properly located on the platen 201, the suction openings 205 will be closed by the label and thereby create a vacuum in the suction line formed by hose 206. The suction in hose 206 is communicated to cylinder 276 through air check valve 252 and hose 270 which is connected to the cylinder. Suction in cylinder 276 causes piston 278 to move to the left (as seen in FIG. 20) and pivots the stop arm 274 in the direction of arrow A out of the path of movement of shaft 42 of the transfer member 200 and permits the shaft to descend in the direction of arrow B (from a position shown in phantom in FIG. 20). A pin 281 limits the movement of arm 274 in the direction of arrow A.

In the event that the machine is cycled without a label properly located on platen 201 covering the suction openings 205 of the platen, the openings are in communication with the atmosphere and air is allowed to enter hose 206. The air leads through air check valve 252 to suction hose 270 which leads to the cylinder 276. Since no vacuum is created in cylinder 276 to pull the piston to the left, the stop arm 274, through gravity, moves to the right in the direction of arrow C (FIG. 21) and blocks the path of movement of shaft 42 of the transfer member 200. As stated above, the shaft is yieldably operated by cam 67 which provides the cycle for the transfer member, and if the shaft 42 of the transfer member is blocked by the stop arm, the cam will merely pull away from the shaft and continue its cycle. Stop arm 274 is urged by gravity in the direction of arrow C at all times, even when it is in abutment with limit pin 281. This is true because the specific gravity of arm 274 is to the right of its pivot 274a in both of its extreme positions.

The piston and cylinder device 272 is provided with a bleeder passage 282 in the cylinder 276 which leads through an annular passage 284 and axial passage 286 in piston 278 and into communication with suction hose 270. This bleeder passage is provided to insure that air will refill bellows 208 so that the bellows can continue its cycle as described above. As the piston moves in the direction of arrow A to pull the stop arm 274 out of the path of movement of the shaft 42, the annular passage 284 in the piston will establish communication between suction hose 270 and bleeder passage 282 leading to the atmosphere. Air will then be drawn in through the bleeder passage into the bellows so that the bellows can again fill with air and make its full movement as cam 67 makes its cycle. It is important that the bleeder passage be provided so that the return action of the bellows will blow the label off of the platen onto a package. In addition, although some air will be forced out of the openings 205 in the platen 201, the openings are sufficiently small to permit the contraction of the bellows to cause sufficient pressure behind piston 278 which in turn aids the stop arm 274 to return back in the direction of arrow C to its blocking position.

It should be noted that once shaft 42 of the transfer member has moved in the direction of arrow B beyond notch 274a of the stop arm 274, the return action of the stop arm in the direction of arrow C does not interfere with the return action of shaft 42 because the shaft will merely slide up the side surface 288 of the stop arm 274 until it again lodges within notch 274a.

It can be seen that since the stop arm 274 moves as a function of the presence or absence of a label on the platen 201, the stop means automatically operates without the addition of a single timing mechanism. The only timing necessary is the expansion or contraction of the bellows caused by a single cam and lever movement in the cycle of the machine which controls the application of suction or pressure at the openings 205 in the platen 201.

The foregoing detailed description has been given for clearness of understanding only and no unnecessary limitations should be understood therefrom as some modifications will be obvious to those skilled in the art.

We claim:

1. A package labelling system comprising means for delivering a printed label, in combination, a transfer member for receiving said delivered label at a first position and movable to a second position for placing the label on a package, said transfer member comprising a platen, guide means adjacent the platen for locating a label relative to the platen, means associated with the platen for releasably holding a located label on the platen, comprising an air opening in said platen, means for holding the label on the platen by suction, air apertures in said guide means for directing air against a label on said platen, means for blowing air out of said apertures at the same time as suction is applied to said platen to have the label lie flush on the platen and render the suction effective to hold the label on the platen, and means for blocking movement of said transfer member to stop the platen at a short distance from a package, and means for directing a blast of air against a label held on the platen while in said blocked position to move a label from the platen to a package.

2. A package labelling system comprising means for delivering a printed label, in combination, a transfer member for receiving said delivered label at a first position and movable to a second position for placing the label on a package, said transfer member comprising an arm mounting a heated platen, means for yieldably moving the arm toward a package, means adjacent the platen for locating a label relative to the platen, means associated with the platen for releasably holding a located label on the platen comprising an air opening in said platen, means connected to said air opening for holding the label by suction and for subsequently discontinuing the suction to aid in removing the label from the platen, and means selectively positionable in the path of said arm to prevent contact of the platen with a package and thereby position the platen whereby the label drops from the platen to the package.

3. In a package labelling system which comprises means for delivering a printed label, a transfer member comprising a platen for receiving said delivered label at a first position and movable to a second position for placing the label on a package, means for yieldably moving the platen toward a package, means for locating a label relative to the platen, an air opening in said platen for releasably holding a located label on the platen, means connected to said air opening for applying suction to the opening to hold the label on said platen, and means selectively positionable in the path of said transfer member to prevent contact of the platen with a package.

4. A package labelling system as set forth in claim 3 wherein said means for applying suction comprises a bellows-like member operative in a cycle to expand and apply said suction and to contract to direct air under pressure against the label to direct the label against a package after the label is released from the platen, said means selectively positionable in the path of said transfer member comprises a stop arm normally positioned in the path of movement of said transfer member, a piston and cylinder device for operating said stop arm, said piston and cylinder device being controlled by said means for applying suction to said air opening such that the piston and cylinder device moves said stop arm out of the path of movement of said transfer member when vacuum is created at said air opening by a located label blocking said opening, and bleeder passage means in said piston and cylinder device operable after the piston and cylinder device has moved said arm out of the path of movement of the transfer member to establish communication between atmosphere and the bellows-like member to permit recycling of the bellows-like member.

5. A package labelling system as set forth in claim 4 wherein said stop arm normally is urged by gravity in one direction into the path of movement of said transfer member, said piston being moved in said cylinder in an opposite direction in response to vacuum created at said air opening to move the stop arm out of the path of movement of said transfer member.

References Cited
UNITED STATES PATENTS

| | | | |
|---|---|---|---|
| 1,315,737 | 9/1919 | Milmoe | 156—571 |
| 3,093,528 | 6/1963 | Reich | 156—285 |
| 3,194,710 | 7/1965 | Stremke et al. | 156—566 XR |
| 3,264,161 | 8/1966 | Stremke | 156—360 |
| 3,372,079 | 3/1968 | Fellner et al. | 156—360 |

JOHN T. GOOLKASIAN, Primary Examiner

D. J. FRITSCH, Assistant Examiner

U.S. Cl. X.R.

156—364, 384, 497, 556